United States Patent [19]

Hamner

[11] 4,073,718
[45] Feb. 14, 1978

[54] PROCESS FOR THE HYDROCONVERSION AND HYDRODESULFURIZATION OF HEAVY FEEDS AND RESIDUA

[75] Inventor: Glen P. Hamner, Baton Rouge, La.

[73] Assignee: Exxon Research & Engineering Co., Linden, N.J.

[21] Appl. No.: 733,717

[22] Filed: Oct. 18, 1976

Related U.S. Application Data

[63] Continuation-in-part of Ser. No. 685,500, May 12, 1976, Pat. No. 4,051,021.

[51] Int. Cl.² ............... C10G 13/06; C10G 39/00; B01J 8/24
[52] U.S. Cl. ......................... 208/80; 208/61; 208/110; 208/111; 208/112; 252/477 R
[58] Field of Search ............ 208/80, 110, 111, 61, 208/112; 252/477 R

[56] References Cited

U.S. PATENT DOCUMENTS

| | | | |
|---|---|---|---|
| 3,340,180 | 9/1967 | Beuther et al. | 208/216 |
| 3,471,399 | 10/1969 | O'Hara | 208/216 |
| 3,770,618 | 11/1973 | Adams et al. | 208/216 |
| 3,814,682 | 6/1974 | Christman et al. | 208/216 |
| 3,830,728 | 8/1974 | Mounce | 208/59 |
| 3,840,508 | 10/1974 | Wilson et al. | 208/80 X |
| 3,852,186 | 12/1974 | Christman et al. | 208/61 X |
| 3,977,961 | 8/1976 | Hamner | 208/59 |
| 3,977,962 | 8/1976 | Arey et al. | 208/59 |

*Primary Examiner*—Herbert Levine
*Assistant Examiner*—G. E. Schmitkons
*Attorney, Agent, or Firm*—Llewellyn A. Proctor

[57] ABSTRACT

A process for the production of low sulfur, low nitrogen fuels at low hydrogen consumption by splitting a feed into two components, a high boiling component, suitably a 1050° F+ fraction, and a low boiling component, suitably a 1050° F− fraction, and processing the two different components over two different types of catalysts, at different severities. Suitably, on the one hand, the high boiling component is treated over a large pore metal hydrogenation catalyst at severity sufficient to convert at least 30 percent, preferably at least 50 percent of the feed, based on the weight of the feed, to a 1050° F− product. The 1050° F− product from the conversion over the large pore metal hydrogenation catalyst is then blended with the low boiling component split from the original feed, and the blended low boiling material is then treated at low severity over a small pore metal hydrogenation catalyst to hydrodesulfurize and hydrodenitrogenate said low boiling components. The product of the hydrodesulfurization, hydrodenitrogenation reaction constitutes a suitable feed for hydrocracking, or for use as a catalytic cracker feed.

26 Claims, No Drawings

PROCESS FOR THE HYDROCONVERSION AND HYDRODESULFURIZATION OF HEAVY FEEDS AND RESIDUA

RELATED APPLICATIONS

This is a continuation-in-part of application Ser. No. 685,500, filed May 12, 1976, now U.S. Pat. No. 4,051,021 herewith incorporated by reference.

Hydrotreating processes, or processes for the treatment of sulfur-bearing hydrocarbon feeds with hydrogen, are well established in the petroleum refining industry. Hydroconversion processes are processes wherein carbon-sulfur bonds are broken to effect hydrodesulfurization; but, more than this, such processes also convert considerable quantities of the relatively high molecular weight hydrocarbons to lower molecular weight hydrocarbons. In a hydroconversion process typically as much as about 30 weight percent, and higher, of the 1050° F+ hydrocarbons are converted to 1050° F− hydrocarbons. In a hydrodesulfurization process, the prime industrial process for the removal of sulfur from sulfur-bearing feeds, relatively little conversion is accomplished. Typically, in the treatment of heavy crudes and residua, the conversion of the 1050° F+ hydrocarbons to 1050° F− hydrocarbons rarely exceeds about 5 or 10 percent.

In a hydrodesulfurization process, e.g., a hydrocarbon oil fraction, including light, middle and residual distillate fractions, or whole heavy crudes and residua, are treated in one or a plurality of stages with hydrogen over a wide range of elevated hydrogen pressures and temperatures in the presence of a catalyst composite which includes a hydrogenation or hydrogenation-dehydrogenation (hydrogen transfer) component comprised of a metal or compound of a metal, or metals, of Group VI and/or Group VIII, of the Periodic Table of the Elements (Sargent-Welch Scientific Company, printed in the U.S.A., copyright 1968). The carbon-sulfur bonds of the molecules constituting the feed, in such reactions, are broken and sulfur-containing moieties react with hydrogen. Principally, hydrogen sulfide, which is evolved from the process, and other suitably disposable sulfur compound are produced. The resulting hydrocarbon stream, reduced in its sulfur content, is separated from the residual mixture of hydrogen and hydrogen sulfide gases.

The hydrodesulfurization of heavy hydrocarbon feedstocks, e.g., petroleum residua, is particularly difficult, much more so than those processes which treat the lighter feedstocks. This is because petroleum residua, or even coker gas oil, vacuum gas oil and petroleum crude, contain (1) asphaltenes and other high molecular weight, aromatic structures which severely inhibit the rate of hydrodesulfurization and cause catalyst deactivation, (2) ash-forming constituents, such as metallo-organic compounds, which decompose and cause catalyst contamination and deactivation, and even interfere with catalyst regeneration, and (3) relatively large quantities of sulfur as contrasted with the lighter feeds, this giving rise to objectionable sulfur oxide emissions upon combustion of such fuels in industrial furnaces. Ecological considerations, reflected in part by governmental demands, require elimination of sulfur from such feeds, but this can be accomplished only in the face of extreme difficulty due to the presence of high boiling materials such as asphaltenes, and ash-forming constituents. High operating costs associated with the problems of catalyst deactivation, short catalyst life and high hydrogen consumption have, until recent years, hindered the commercial utilization of processes capable of handling such feeds.

In hydrodesulfurization processes, particularly those employed for the treatment of heavy crudes and residua, hydrogen is consumed in excess of the stoichiometric quantities actually required to eliminate sulfur, or other undesirable components such as nitrogen. For example, aromatic feed components are generally partially saturated, and at sufficiently severe conditions are almost fully saturated. Hydrogen in excess of that actually required to effect the desulfurization is essentially wasted, and generally the value of the over-hydrogenated product is decreased because of the excessive hydrogenation. For example, the pour point of fuel oils, and the heating value of the fuel oil is decreased. In high severity hydrodesulfurization reactions, as required in the hydrodesulfurization of whole heavy feeds and residua, hydrogen waste is particularly acute. Hydrogen is very expensive, not only because of product quality deterioration and its relatively high cost, but also due in large part to the cost of associated compression, recirculation and high pressure equipment, which is needed in proportion to the amount of hydrogen utilized in a process.

The problem of excessive hydrogen consumption is even more acute in hydroconversion processes wherein it is necessary to operate at considerably higher severity than in hydrodesulfurization processes. Far more hydrogen is added in the processing than is required for mending the carbon-sulfur, carbon-nitrogen, carbon-carbon bonds and the like. There exists a need for processes which utilize hydrogen sparingly, while yet efficiently achieving high conversion, and deep hydrodesulfurization, particularly those processes used for processing the heavier feeds which contain molecules, or greater concentrations of molecules having the more complex ring structures.

It is accordingly among the objects of this invention:

To supply this need, and particularly to obviate the foregoing and other prior art disadvantages by providing a further improved hydrodesulfurization process, notably a combination hydroconversion-hydrodesulfurization process for the more efficient utilization of hydrogen.

To provide a new and improved combination hydroconversion-hydrodesulfurization process for the more efficient utilization of hydrogen.

To provide a new and improved combination hydroconversion-hydrodesulfurization process, particularly one suitable for the production of low sulfur, low nitrogen products, e.g., gas oil or fuel oil, at low hydrogen consumption; and especially one suitable for the high conversion and deep hydrodesulfurization of whole heavy crudes and residua, notably those containing high metals, high Con carbon, high concentrations of asphaltenes and other heavy hydrocarbons boiling above 1050° F, sand, scale, and the like.

These and other objects are achieved in accordance with the present invention, a process for the production of low sulfur, low nitrogen fuels at low hydrogen consumption which comprises splitting a feed, notably a whole heavy crude or residuum, into two components, a high boiling component, suitably a component with a low end boiling point within the range of from about 850° to about 1100° F, preferably from about 900° to about 1050° F, most preferably a 1050° F+ fraction, and a low boiling component, or component with an upper end boiling point within the range of from about 850° to about 1100° F, preferably from about 900° to about 1050° F, most preferably a 1050° F— fraction, and processing the two different feed components over two different types of catalysts, at different severities. Suitably, on the one hand, the high boiling feed component is contacted in a hydroconversion zone (or firststage) in the presence of hydrogen, over a "large pore" catalyst, or catalyst having greater than fifty percent, preferably greater than seventy percent, and more preferably greater than ninety percent, of its total pore volume of absolute diameter ranging from about 70A to about 200A, with pore diameters below 70A and above 200A being minimized, at severity sufficient to obtain at least about 30 percent conversion, preferably at least about 50 percent conversion, and most preferably from about 50 to about 90 percent conversion, of the high boiling components, notably the 1050° F+ components, to hydrocarbons boiling below about 1050° F, i.e., 1050° F—, at conditions defined as follows:

| Variable | Operable Range | Preferred Range |
|---|---|---|
| Temperature, ° F. | 700–850 | 750–825 |
| Pressure, psig | 1000–5000 | 2000–4000 |
| Space Velocity, V/V/Hr. | 0.15–2 | 0.25–1.0 |
| Hydrogen Rate, SCF/Bbl. | 2000–20,000 | 4000–6000 |

The high boiling component is recycled to extinction in the hydroconversion zone, and thereby converted to a low boiling gas oil component, recovered as a by-product of the process, or blended with a desulfurized gas oil component, suitably the product of the hydrodesulfurization, hydrodenitrogenation stage, to provide fuel oil. The low boiling component from the hydroconversion zone, suitably a hydrocarbon component having an upper end boiling within the range of from about 850° to about 1100° F, preferably from about 900° to about 1050° F, and most preferably a 1050° F— fraction, is blended with the low boiling component obtained from the split feed and contacted in a hydrodesulfurization zone (or second stage), in the presence of hydrogen, with a "small pore" catalyst, or catalyst having greater than 50 percent, preferably greater than 75 percent, and more preferably greater than 90 percent, of its total pore volume of absolute diameter ranging from about 50A to about 120A, at low severity, or severity sufficient to obtain from about 80 to about 99 percent, preferably from about 85 to about 95 percent desulfurization of said effluent introduced to said hydrodesulfurization zone as feed, based on weight, at conditions defined as follows:

| Variable | Operable Range | Preferred Range |
|---|---|---|
| Temperature, ° F. | 600–750 | 650–725 |
| Pressure, psig | 200–1500 | 500–1200 |
| Space Velocity, V/V/Hr. | 0.1–2 | 0.3–1.0 |
| Hydrogen Rate, SCF/Bbl | 1500–20,000 | 2000–4000 |

The low boiling product per se provides a suitable feed for use in a hydrocracker or catalytic cracker, or when combined with the high boiling by-product of the hydroconversion stage provides fuel oil, supra.

In another embodiment, a portion of the product from the second, or hydrodesulfurization stage can be blended back with the high boiling point component split from the original feed, and this blend then fed into the first, or hydroconversion stage to produce better demetallization, higher desulfurization with less hydrogen consumption. Suitably, from about 25 to about 75 percent, preferably from about 40 to about 60 percent, based on the weight of the liquid effluent from the second, or hydrodesulfurization stage is blended back with the low end boiling point component for use as feed to the first, or hydroconversion stage.

The large pore catalyst has been found particularly suitable for conversion, hydrodesulfurization, hydrodenitrogenation and demetallization of the high boiling component, notably the 1050° F+ components, in the first stage at the conditions defined, without excessive hydrogen consumption. Whereas the small pore catalyst is entirely unsuitable for hydrotreatment of the whole feed at any conditions, it has been found admirably suitable as a second stage catalyst for hydrodesulfurization, or further hydrodesulfurization of the compounds which were not hydrodesulfurized in the conversion stage. In this service, the small pore catalyst is far more effective than the large pore conversion catalyst. Each catalyst is thus used to best advantage in the split feed two-stage operation. The two-stage operation is highly effective for maximizing overall desulfurization, denitrogenation, and demetallization, with minimization of the total hydrogen consumption.

The catalysts of both the hydroconversion and hydrodesulfurization stages are each comprised of a composite of an inorganic oxide base with a hydrogenation or hydrogenation-dehydrogenation (hydrogen transfer) component, suitably a metal or compound of a metal, or an admixture of the metals or compounds of the metals, especially one selected from Group VIB and/or Group VIII of the Periodic Table of the Elements. In general, the concentration of the Group VIB metal ranges from about 5 to about 30 percent, and the Group VIII metal, preferably a non-noble metal, ranges from about 1 to about 12 percent, based on the weight of the catalyst (measured as an oxide). The preferred active Group VIII metallic component is comprised of nickel or cobalt, particularly the latter, and the preferred Group VIB metallic component is comprised of molybdenum or tungsten. These metallic components can exist in various forms, oxides, sulfides, metallic metals, or the like. The catalyst base can be alumina-stabilized with silica in concentration ranging from about 0.5 to about 6 percent, and about 94 to about 99.5 percent alumina.

The composition of the preferred catalysts, in weight percent, is summarized as follows:

| | Range of Compositions | |
|---|---|---|
| | Typical | Preferred |
| Nickel or Cobalt (as Oxide) | 1–15 | 2–6 |
| Molybdenum or Tungsten (as Oxide) | 5–25 | 10–20 |

The pore volume of the large pore, hydroconversion catalysts ranges between about 0.6 cc/g and 1.5 cc/g (B.E.T.), and preferably from about 0.6 cc/g to about 1.0 cc/g. The surface area of such catalysts ranges between about 150 m²/g and 450 m²/g, preferably from about 200 m²/g to about 350 m²/g.

In its more specific aspects, the hydroconversion catalysts are characterized as follows:

| Distribution of Pore Diameters[1] | Marginal | Preferred | More Preferred |
|---|---|---|---|
| 0–50A | <3 | <1 | 0 |
| 50–100A | <22 | <24 | <8 |
| 100–200A | >50 | >70 | >90 |
| 200A+ | <25 | 0 | 0 |
| Pore Vol., cc/g | 0.6–2.0 | 0.6–1.5 | 0.6–1.0 |
| Surface Area, m²/g | 150–450 | 200–400 | 250–350 |

[1]Measured by nitrogen adsorption isotherm, wherein nitrogen adsorbed is at various pressures. Technique described in Ballou et al, Analytical Chemistry, Vol. 32, April, 1960, using Aminco Adsorptomat [(Catalogue No. 4-4680) and Multiple Sample Accessory (Catalogue No. 4-4685) Instruction No. 861-A] which uses the principle of adsorption and desorption of gas by a catalyst specimen at the boiling point of nitrogen.

The pore volume of the small pore, hydrodesulfurization catalysts ranges between about 0.3 cc/g and 0.7 cc/g (B.E.T.), and preferably from about 0.4 to about 0.6 cc/g. The surface area of these catalysts ranges from about 150 m²/g to about 400 m²/g, preferably from about 200 m²/g to about 350 m²/g.

In its more preferred aspects, the hydrodesulfurization catalysts are characterized as follows:

| Distribution of Pore Diameters[1] | Marginal | Preferred | More Preferred |
|---|---|---|---|
| 0–50A | <30 | <10 | <5 |
| 50–100A | >30 | >40 | >50 |
| 100–150A | >30 | >40 | >35 |
| 150A | <10 | <5 | <5 |
| Pore Volume, cc/g | 0.3–0.8 | 0.4–0.7 | 0.45–0.6 |
| Surface Area, m²/g | 150–450 | 200–400 | 250–350 |

In accordance with a preferred mode of practicing the present invention, a sulfur-containing petroleum vacuum residuum feed, or feed containing generally from about 2 to about 6 percent sulfur by weight, is split into a high boiling component, and a low boiling component. The high boiling component is preheated to reaction temperature and passed, with hydrogen, in concurrent flow, downwardly through a multiple fixed bed, first stage reactor which contains the large pore catalyst. The conditions of reaction are as specified for the first hydroconversion zone. The several beds of the reactor, containing fixed beds of the catalyst, are separated one from the other. Suitably, if desired, a water or hydrogen quench can be injected into the spaces between the beds (reaction zones). As the run progresses, the temperature of reaction is gradually raised to maintain substantially constant catalyst activity. The effluent from the reactor is fed to a high temperature-high pressure separator for further removal of hydrogen, hydrogen sulfide, and light ends. Desulfurized liquid product from the separator is then passed to a stripper wherein steam is injected for further separation of hydrogen sulfide and liquid product. Desulfurized product, after separation from the water, is removed from the bottom of the stripper and that portion of the liquid effluent which boils below a selected end boiling point within the range of from about 850° to about 1100° F, preferably from about 900° to about 1050° F, more preferably the 1050° F− portion of the liquid product is blended with the low boiling component split from the original feed, and the blended low boiling material is then passed to a second reactor which contains the small pore catalyst. The second reactor is operated at the conditions specified for the second, or hydrodesulfurization zone, the reactor design and mode of operation being essentially as described with reference to the first reactor.

The hydrocarbon feeds which can be subjected to hydroconversion and hydrodesulfurization pursuant to the practice of this invention include coal liquids, whole heavy crude and residua. Such feeds are of generally the following characteristics:

|  | Typical Range | Preferred Range |
|---|---|---|
| Gravity, ° API | −5 to 30 | 5–20 |
| Sulfur, Wt.% | 0.02–6.0 | 0.2–3.5 |
| Nitrogen, Wt.% | 0.05–2.0 | 0.1–1.0 |
| Heavy Metals, ppm (Ni & V) | 0–1000 | 2–200 |
| 1050° F+, Wt.% | 50–100 | 10–50 |
| Asphaltenes, Wt.% (C₅ insolubles) | 10–30 | 5–20 |
| Con Carbon, Wt.% | 10–50 | 15–25 |

At typical and preferred conditions, products having the following characteristics are produced.

|  | Typical Range | Preferred Range |
|---|---|---|
| Gravity, ° API | 10–35 | 15–28 |
| Sulfur, Wt.% | 0.1–0.6 | 0.05–0.3 |
| Nitrogen, Wt.% | 0.1–0.25 | 0.05–0.2 |
| Heavy Metals, ppm (Ni & V) | <5–100 | <2–50 |
| 1050° F+, Wt.% | 0.5–50 | 1–15 |
| Asphaltenes, Wt.% (C₅ insolubles) | 0.1–15 | 0.05–10 |
| Con Carbon, Wt.% | 0.1–15 | nil–10 |

The process of this invention has proven highly effective for hydroconverting and hydrodesulfurizing sulfur-containing hydrocarbon feeds, and accomplishing this with low hydrogen consumption. The reasons for this are not completely understood and, while Applicant has no desire to be bound by any specific theory of mechanism, it is believed that the results achieved are, at least in part, susceptable of explanation. It is believed that a correlation exists between the molecular size of the sulfur-bearing molecules and the pore size openings of the catalyst. There exists in a catalyst, on the one hand, an intra-particle diffusion rate limitation whereby relatively large sulfur-containing feed molecules cannot enter the pores of the catalyst if the pores are too small. On the other hand, if the catalyst pores are of excessive diameter such that they permit not only the entry of sulfur-containing feed molecules, but also larger organo-metallic or metals-bearing molecules, the latter decompose, and deposit metals within the pores.

Relating this theory to the instant process, first stage catalyst contains a maximum of pore size diameters within the 70A to 200A pore size range which, it has been found, permits entry of the heavy feed components processed thereover, this maximizing the accessibility of the molecules to catalytic sites and consequently the ability of the catalyst to desulfurize the heavy feed components. Openings smaller than 70A, which are within the optimum for second stage operation, are minimized since they have only a limited ability to permit effective ingress of the sulfur-bearing molecules; and pore size openings ranging above 200A are minimized because the larger openings permit ingress of metals-bearing molecules which lessen desulfurization, suppress active catalytic sites and decrease the activity maintenance of the catalyst. Low boiling components are excluded from the hydroconversion stage, not only because the effectiveness of the treatment of these components is marginal, but because such treatment consumes excessive hydrogen. In the second stage, or hydrodesulfurization operation, on the other hand, the sulfur-containing feed molecules are smaller and the small pore size distribution provided by the small pore catalyst is far more effective for processing this type of feed; and it accomplishes such treatment with minimum hydrogen consumption. The small pore catalyst, despite its ineffectiveness for use in the hydroconversion stage for processing a heavy feed, is thus admirably suitable as a second stage catalyst. Less hydrogen is required to effect the same degree of hydrodesulfurization in the two-stage process of this invention at corresponding severities than in a one-, or two-stage process using only one kind of catalyst; or in a two-stage process at corresponding severities where the total feed is contacted with both catalysts.

The invention will be better understood by reference to the following selected examples and comparative data which illustrate its more salient features. The examples illustrate the production of improved quality 1050° F− liquids from very heavy crudes with less hydrogen consumption than one- and two-stage hydrodesulfurization processes previously used to process such feed.

In the examples and demonstrations, side-by-side runs were made to provide direct comparisons of the desulfurization activity and hydrogen consumption between runs conducted according to the process of this invention vis-a-vis runs conducted with similar feeds in related processes.

In preparation for a run, a previously prepared catalyst was first calcined at 1000° F for 2 hours. The catalyst was then charged to the reactor within which it was to be used, and it was then sulfided at atmospheric pressure using a gas mixture, 10 percent hydrogen sulfide in hydrogen. When sulfiding was completed, a run was then initiated using a petroleum residuum feed characterized in Table I as follows:

TABLE I

| | FEEDSTOCK INSPECTIONS | | | | |
|---|---|---|---|---|---|
| | Jobo Crude | Jobo Virgin and R-1 Conversion Gas Oil feed | Jobo Vac. Btms. | Hawkins Vac. Btms. Diluted | Hawkins Vac. Btms. |
| Inspections | | | | | |
| Gravity, ° API | 8.5 | 18.4 | 2.6 | 15.7 | 6.0 |
| Sulfur, Wt.% | 4.12 | 2.28 | 4.23 | 2.53 | 4.32 |
| Nitrogen, Wt.% | 0.684 | 0.211 | 0.82 | 0.178 | 0.275 |
| Oxygen, Wt.% | 0.57 | — | 0.63 | — | — |
| Con. Carbon, Wt.% | 13.8 | 0.5 | 22.9 | 11.8 | 21.7 |
| Asphaltenes ($C_5$), Wt.% | 17.7 | — | 35.0 | 9.3 | 21.5 |
| Carbon, Wt.% | 83.92 | 85.88 | 83.84 | 85.96 | 84.63 |
| Hydrogen, Wt.% | 10.49 | 11.44 | 9.69 | 11.37 | 10.0 |
| Metals, ppm | | | | | |
| Ni | 120 | — | 135 | 7.2 | 14.7 |
| V | 442 | — | 723 | 10.7 | 19.1 |
| Fe | 10 | — | 18 | 5.2 | 11.0 |
| Na | 180 | — | 225 | — | — |
| Solids (3 micron-filter) | 386 | — | 535 | — | — |
| VSU at 210° F | 247 | — | — | — | — |
| D-1160 | | | | | |
| IBP | 518 | 360 | 985 | 450 | 992 |
| 5 | 629 | 438 | 1050 | 485 | 1003 |
| 10 | 682 | 505 | — | 618 | 1030 |
| 20 | 798 | 576 | — | 722 | — |
| 30 | 895 | 643 | — | 830 | — |
| 40 | 978 | 714 | — | 926 | — |
| FBP | 1050 | 1050 | 1050 | 1050 | 1050 |
| % Rec. | 50.8 | 98 | 5 | 55.0 | 12.5 |
| % Res. | 48.2 | 1.5 | 95 | 45.0 | 87.5 |
| Light Ends | 1.0 | 0.5 | — | — | — |

The several catalysts employed in the runs are characterized as follows:

TABLE II

| Catalyst | A | B | C |
|---|---|---|---|
| Composition, Wt.% | | | |
| CoO | 6.0 | 3.5 | 3.5 |
| $MoO_3$ | 24.0 | 12.0 | 12.0 |
| $SiO_2$ | — | 1.5 | — |
| $Al_2O_3$ | 70.0 | 83.0 | 84.5 |
| Physical Properties | | | |
| Surface Area, m²/g | 330 | 280 | 214 |
| Pore Volume, cc/g | 1.5 | 0.52 | 0.70 |
| Pore Distribution: | | | |
| 0–50A | 1.0 | 18.0 | 0.0 |
| 50–100A | 12.0 | 61.0 | 29.0 |
| 100–200A | 63.0 | 21.0 | 51.0 |
| 200A+ | 24.0 | — | 20.0 |

EXAMPLE 1

One hundred barrels of a Jobo feed, as characterized in Table I, was split in a vacuum tower into two portions, a 52-barrel top portion boiling at 1050° F− and a 48-barrel bottoms portion boiling at 1050° F+. The 1050° F+ bottoms portion at reaction temperature was then concurrently fed, with hydrogen, downwardly through a reactor (R-1) and contacted with Catalyst A at high severity conditions, sufficient to convert 32 weight percent of the 1050° F+ material to 1050° F− material, defined as follows:

| Temperature, ° F | 740 |
|---|---|
| Pressure, psig | 2200 |
| Space Velocity, V/V/Hr. | 0.87 |
| Hydrogen Rate, SCF/Bbl | 6000 |

Effluent from the R-1 reactor was then separated into 32.6 barrels of a 1050° F+ bottoms product and 15.4 barrels of a 1050° F− fraction, which was combined with the 52-barrel 1050° F− product obtained as the overhead product of the vacuum tower, and the combined total of 67.4 barrels of 1050° F− product then flowed concurrently downwardly with hydrogen in a reactor (R-2), and contacted with Catalyst B at low severity conditions, sufficient to hydrodesulfurize and effect removal of 95 percent of the sulfur, defined as follows:

| | |
|---|---|
| Temperature, ° F | 656 |
| Pressure, psig | 800 |
| Space Velocity, V/V/Hr. | 1.01 |
| Hydrogen Rate, SCF/Bbl | 400 |

A balance on the products removed from the reactors, and the hydrogen consumption in each of the reactors is as follows:

(a) R-1 reactor conversion product: 15.4 barrels of gas oil containing 0.52 percent sulfur.

(b) R-1 reactor $H_2$ consumption: 790 SCF/Bbl hydrogen per barrel of feed (48.0 bbl.).

(c) R-2 reactor product: 67.4 barrels of gas oil containing 0.16 weight percent sulfur.

(d) R-2 reactor $H_2$ consumption: 250 SCF/Bbl hydrogen per barrel of feed (67.4 bbl.).

(e) R-1 and R-2, total $H_2$ consumption: 550 SCF/Bbl of hydrogen per barrel of Jobo Crude processed to produce a net of 67.4 Bbl. of gas oil product having low sulfur and nitrogen content.

COMPARATIVE DEMONSTRATIONS

The following Demonstrations A, B and C can be directly compared with the foregoing example to show the advantages which can be achieved in accordance with the present invention, notably as relates to hydrogen saving. Demonstration A, immediately following is exemplary of a run wherein essentially the same production is achieved from an identical amount of the same feed, utilizing a single reactor charged with the same small pore catalyst employed in the R-2 reactor of the preceding example. As shown, to accomplish this, the reactor necessarily had to be operated at high severity, and with greater hydrogen consumption.

(A) One hundred barrels of a Jobo feed as characterized in Table I was preheated to reaction temperature, and concurrently fed with hydrogen downwardly through a reactor containing Catalyst B. The effluent from the reactor was split in a fractionation column into 68 barrels of a 1050° F— gas oil product which contains 0.18 weight percent sulfur, and 31 barrels of a 1050° F+ product.

The reactor was operated at conditions sufficient to convert 38 percent by weight of the 1050° F+ hydrocarbon to 1050° F— hydrocarbons, defined as follows:

| | |
|---|---|
| Temperature, ° F | 800 |
| Pressure, psig | 2800 |
| Space Velocity, V/V/Hr. | 0.68 |
| Hydrogen Rate, SCF/Bbl | 5900 |

Pursuant to these conditions, a total of 1086 SCF/Bbl. hydrogen was consumed per barrel of feed, as contrasted with 550 SCF/Bbl. of hydrogen per barrel of feed in the process described by the preceding example.

In an additional run, at 50% conversion, 1375 SCF/Bbl. of hydrogen per barrel of feed was required. At either level of conversion, the activity maintenance of the catalyst was very poor.

In the following run that is described, the preceding demonstration was repeated except that Catalyst A, a large pore catalyst, was charged into the reactor, and the reactor was operated at the conditions required to obtain essentially the same volume and kind of products as produced with the small pore catalyst.

(B) One hundred barrels of a Jobo feed as characterized in Table I was preheated to reaction temperature, and concurrently fed with hydrogen, downwardly through a reactor containing a charge of Catalyst A, in quantity similar to that contained in the reactor of Demonstration A. The effluent from the reactor was split in a fractionation column into 68 barrels of a 1050° F— gas oil product which contains 0.16 weight percent sulfur, and 32 barrels of a 1050° F+ product.

The reactor was operated at conditions sufficient to convert 33 percent by weight of the 1050° F+ hydrocarbon to 1050° F— hydrocarbons, defined as follows:

| | |
|---|---|
| Temperature, ° F | 738 |
| Pressure, psig | 2250 |
| Space Velocity, V/V/Hr. | 0.24 |
| Hydrogen Rate, SCF/Bbl | 4000 |

Pursuant to these conditions, a total of 1000 SCF/Bbl. hydrogen was consumed per barrel of feed as contrasted with 550 SCF/Bbl. of hydrogen per barrel of feed as in the exemplified process of this invention.

The total liquid effluent low sulfur fuel oil from the reactor contained 0.6 Wt.% sulfur, this being an effective desulfurization of 85% of the feed sulfur.

Demonstration C, which follows, can also be compared with the foregoing example to show that the present invention can also be used to produce fuel oil at enhanced hydrogen savings.

(C) Jobo crude as characterized in Table I was preheated to reaction temperature, and concurrently fed with hydrogen downwardly through a reactor containing Catalyst B. The liquid effluent (low sulfur fuel oil) from the reactor contained 0.6 weight percent sulfur.

The reactor was operated at conditions to convert 85 percent by weight of the sulfur in the feed, defined as follows:

| | |
|---|---|
| Temperature, ° F | 800 |
| Pressure, psig | 2800 |
| Space Velocity, V/V/Hr. | 0.69 |
| Hydrogen Rate, SCF/Bbl. | 5800 |

Pursuant to these conditions, a total of 1230 SCF/Bbl. hydrogen was consumed per barrel of feed as contrasted with 550 SCF/Bbl. of hydrogen per barrel of feed in the process described in Example 1 where the hydrofined gas oil fraction was blended with the hydrotreated 1050° F+ fraction from the R-1 product fractionator to produce low sulfur fuel oil having 0.6 Wt.% sulfur content.

The following comparative data shows the advantages which can be obtained by blending a portion of the gas oil product from the second, or hydrodesulfurization reactor, with a high boiling feed component split from an original feed, wherein the blend is converted in a hydroconversion reactor to produce fuel oil. Demonstration D shows the results of a run where there is no dilution of the heavy feed which is introduced into the hydroconversion reactor.

In Demonstration D, immediately below, Hawkins vacuum bottoms, as characterized in the sixth column of Table I, was preheated to reaction temperature, and concurrently fed with hydrogen downwardly, in two separate runs through reactors containing like volumes of Catalyst B and Catalyst C, respectively, at the conditions tabulated immediately below. The liquid effluent from each of the reactors, in each of the several runs, contained <0.4 Wt.% sulfur.

The reactors, in each instance, were operated at conditions to convert <88 percent by weight of the sulfur in the feed, at conditions defined as follows:

|  | Catalyst B | | Catalyst C | |
|---|---|---|---|---|
| Temperature, ° F | 700 | 750 | 700 | 750 |
| Pressure, psig | | 2200 | | |
| Space Velocity, V/V/Hr. | 0.07 | 0.29 | 0.118 | 0.35 |
| Hydrogen Gas Rate, SCF/Bbl. | | 1000 | | |
| Sulfur, Activity Constant | 0.178 | 0.224 | 0.247 | 0.265 |
| % Hydrodesulfurization | 92.5 | 88.2 | 90.1 | 88.0 |
| Hydrogen Consumption, SCF/Bbl.* | 1300 | 1120 | 1048 | 1000 |

*Assumed no additional hydrogen uptake in the hydrotreated gas oil fraction of the feed.

In producing a low sulfur product in the R-1 operation, at these conditions, it is noted that lower hydrogen consumption and a corresponding increase in feed rate is obtainable with the larger pore catalyst.

The following Example 2 is a simulated run which shows the advantages of diluting the heavy feed to the hydroconversion reactor with gas oil. To simulate such condition Hawkins vacuum bottoms, as characterized in the sixth column of Table I, is diluted with gas oil to provide a diluted Hawkins vacuum bottoms feed as characterized in the fifth column of Table I.

EXAMPLE 2

Hawkins vacuum residua, as characterized in Table I, was blended with a 90% hydrodesulfurized gas oil product from a low pressure second stage operation similar to that described in Example 1, preheated to reaction temperature and concurrently fed with hydrogen downwardly, in two separate runs through reactors containing like volumes of Catalyst B and Catalyst C, respectively at the conditions tabulated immediately below. The liquid effluent (low sulfur fuel oil) from each of the reactors, as in Demonstration D, contained <0.4 Wt.% sulfur.

The reactors, in each instance, were operated at conditions to convert >88 percent by weight of the sulfur in the feed, at conditions defined as follows:

|  | Catalyst B | | Catalyst C | |
|---|---|---|---|---|
| Temperature, ° F | 700 | 750 | 700 | 750 |
| Pressure, psig | | 2200 | | |
| Space Velocity, V/V/Hr. | 0.135 | 0.615 | 0.34 | 0.74 |
| Hydrogen Rate, SCF/Bbl. | | 4000 | | |
| Sulfur, K, 1.5 | 0.421 | 0.701 | 0.798 | 0.62 |
| % Hydrodesulfurization | 91.7 | 89.5 | 87.9 | 85.0 |
| Hydrogen Consumption, SCF/Bbl.(a) | 1370 | 1350 | 1050 | 1060 |

(a) Assumed no additional hydrogen up-take in the hydrotreated gas oil fraction of the feed.

The advantages of decreased hydrogen consumption in each instance is readily apparent when these results are compared to Demonstration D.

Higher feed rate and lower hydrogen consumption were realized with the larger pore catalyst when operating at the lower temperature with the hydrotreated gas oil diluted feed.

It is apparent that various modifications can be made in the conditions of operation, the precise nature of the feed and catalyst compositions, and the like, without departing the spirit and scope of the invention.

Pore size distributions, as percent of total pore volume, for purposes of the present invention are measured at various pressures using the Aminco Adsorptomat Cat. No. 4-4680, and multiple sample accessory Cat. No. 4-4685. The detailed procedure is described in the Aminco Instruction Manual No. 861-A furnished with the instrument. A description of the Adsorptomat prototype instrument and procedure is given in Analytical Chemistry, Volume 32, Page 532, April, 1960.

An outline of the procedure is given here, including sample preparation.

From 0.2 to 1.0 g. of sample is used and the isotherm is run in the adsorption mode only. All samples are placed on the preconditioner before analysis where they are out-gassed and dried at 190° C under vacuum ($10^{-5}$ Torr) for 5 hours. After pretreatment, the weighed sample is charged to the Adsorptomat and pumped down to $10^{-5}$ Torr. At this point, the instrument is set in the automatic adsorption mode to charge a standard volume of gas to the catalyst. This is done by charging a predetermined number of volumes as doses and then allowing time for adsorption of the nitrogen to reach equilibrium pressure. The pressure is measured in terms of its ratio to the saturation pressure of boiling liquid nitrogen. Three doses are injected and 8 minutes allowed for equilibration of each measured relative pressure. The dosing and equilibration are continued until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the BET area, and the pore size distribution of the Barrett, Joyner, and Halenda method. [Barrett, Joyner, and Halenda, J. Am. Chem. Soc. 73, p. 373.] It is believed that the Barrett, Joyner, and Halenda method is as complete a treatment as can be obtained, based on the assumptions of cylindrical pores and the validity of the Kelvin equation.

Having described the invention, what is claimed is:

1. A process for the hydroconversion and hydrodesulfurization of a sulfur-bearing heavy hydrocarbon feed which comprises splitting said heavy hydrocarbon feed into a high boiling component having a low end boiling point within a range of from about 850° to about 1100° F, and a low boiling component having a high end boiling point within a range of from about 850° to about 1100° F, contacting said high boiling component feed in a first stage, in the presence of added hydrogen, with catalyst comprising a composite of a porous inorganic oxide support and a metal hydrogenation-dehydrogenation component constituted of from about 5 to about 30 percent of a Group VIB metal, or compound thereof, and from about 1 to about 12 percent of a Group VIII metal, or compound thereof, or admixture of said Group VIB and VIII metals or compounds thereof, said catalyst composite comprising greater than 50 percent of its total pore volume of absolute diameter within the range of from about 70A to about 200A, to convert at least about 30 percent by weight of the 1050° F+ hydrocarbons to 1050° F− hydrocarbons, separating hydrogen, light ends and by-product hydrogen sulfide from the effluent, and separating therefrom a product having a high end boiling point ranging from about 850° to about 1100° F, blending said product of high end boiling point with the low boiling component split from the original heavy hydrocarbon feed, and then contacting said blended low boiling material in a second stage with catalyst comprising a composite of a porous inorganic oxide support and a metal hydrogenation-dehydrogenation component constituted of from about 5 to about 30 percent of a Group VIB metal, or compound thereof, and from about 1 to about 12 percent of a Group VIII metal, or admixture of said Group VIB and VIII metals or compounds thereof, said catalyst composite comprising greater than 50 percent of its total pore volume of absolute diameter ranging from about 50A to about 120A, at severity sufficient to desulfurize from about 80 to about 99 percent of the blended low boiling materials, based on the weight of the liquid introduced as feed to said second desulfurization stage.

2. The process of claim 1 wherein the heavy hydrocarbon feed is split into a high boiling component having a low end boiling point with a range of from about 900° to about 1050° F, and the low boiling component has a high end boiling point within a range of from about 900° to about 1050° F.

3. The process of claim 1 wherein the heavy hydrocarbon feed is split into a high boiling component having a low end boiling point of about 1050° F, and the low boiling component is one having a high end boiling point of about 1050° F.

4. The process of claim 1 wherein greater than about 70 percent of the total pore volume of the first stage catalyst is of absolute diameter within the range of from about 70A to about 200A.

5. The process of claim 1 wherein greater than about 90 percent of the total pore volume of the first stage catalyst is of absolute diameter within the range of from about 70A to about 200A.

6. The process of claim 1 wherein the Group VIB metal of the first stage catalyst is tungsten or molybdenum.

7. The process of claim 1 wherein the Group VIII metal of the first stage catalyst is cobalt or nickel.

8. The process of claim 1 wherein the inorganic oxide support of the first stage catalyst is alumina.

9. The process of claim 1 wherein the inorganic oxide support of the first stage catalyst is alumina stabilized with silica.

10. The process of claim 1 wherein the first stage catalyst is characterized as follows:

| Distribution of Pore Diameter | |
|---|---|
| 0-50A | <3 |
| 50-100A | <22 |
| 100-200A | <50 |
| 200A+ | >25 |
| Pore Volume, cc/g | 0.6-2.0 |
| Surface Area, m²/g | 150-450 |

11. The process of claim 1 wherein the first stage catalyst is characterized as follows:

| Distribution of Pore Diameter | |
|---|---|
| 0-50A | <1 |
| 50-100A | <14 |
| 100-200A | >70 |
| 200A+ | 0 |
| Pore Volume, cc/g | 0.6-1.5 |
| Surface Area, m²/g | 200-400 |

12. The process of claim 1 wherein the first stage catalyst is characterized as follows:

| Distribution of Pore Diameter | |
|---|---|
| 0-50A | 0 |
| 50-100A | <8 |
| 100-200A | >90 |
| 200A+ | 0 |
| Pore Volume, cc/g | 0.6-1.0 |
| Surface Area, m²/g | 250-350 |

13. The process of claim 1 wherein, in the first stage, greater than about 50 percent of the 1050° F+ hydrocarbons of the high boiling point component is converted to 1050° F− hydrocarbons.

14. The process of claim 1 wherein, in the first stage, from about 50 to about 90 percent of the 1050° F+ hydrocarbons of the high boiling point component is converted to 1050° F− hydrocarbons.

15. The process of claim 1 wherein greater than about 75 percent of the total pore volume of the second stage catalyst is of absolute diameter within the range of from about 50A to about 120A.

16. The process of claim 15 wherein greater than about 90 percent of the total pore volume of the second stage catalyst is of absolute diameter within the range of from about 50A to about 120A.

17. The process of claim 16 wherein the Group VIB metal of the second stage catalyst is tungsten or molybdenum.

18. The process of claim 15 wherein the Group VIII metal of the second stage catalyst is cobalt or nickel.

19. The process of claim 15 wherein the inorganic oxide support of the second stage catalyst is alumina.

20. The process of claim 15 wherein the inorganic oxide support of the second stage catalyst is alumina stabilized with silica.

21. The process of claim 15 wherein the second stage catalyst is characterized as follows:

| Distribution of Pore Diameter | |
|---|---|
| 0-50A | <30 |
| 50-100A | >30 |
| 100-150A | >30 |
| 150A+ | <10 |
| Pore Volume, cc/g | 0.3-0.8 |

| Distribution of Pore Diameter | |
| --- | --- |
| Surface Area, m²/g | 150–450 |

22. The process of claim 15 wherein the second stage catalyst is characterized as follows:

| Distribution of Pore Diameter | |
| --- | --- |
| 0–50A | <10 |
| 50–100A | >40 |
| 100–150A | >40 |
| 150A+ | <5 |
| Pore Volume, cc/g | 0.4–0.7 |
| Surface Area, m²/g | 200–400 |

23. The process of claim 15 wherein the second stage catalyst is characterized as follows:

| Distribution of Pore Diameter | |
| --- | --- |
| 0–50A | <5 |
| 50–100A | >50 |
| 100–150A | >35 |
| 150A+ | <5 |
| Pore Volume, cc/g | 0.45–0.6 |
| Surface Area, m²/g | 250–350 |

24. The process of claim 1 wherein the product of the first stage hydroconversion is split into (a) a product having a high end boiling point ranging from about 850° to about 1100° F. which is blended with the low boiling component split from the original heavy hydrocarbon feed, and the blended material hydrodesulfurized in the second hydrodesulfurization stage, and (b) a product having a low end boiling point ranging from about 850° to about 1100° F., and the latter product (b) and the effluent from the second hydrodesulfurization stage are blended to produce a fuel oil.

25. The process of claim 1 wherein a liquid product is recovered from the second desulfurization stage, and a portion thereof is blended with the high boiling component split from the original heavy hydrocarbon feed and fed into the first hydroconversion stage.

26. The process of claim 25 wherein from about 25 to about 75 percent of the liquid product from the second hydrodesulfurization stage, based on the total weight of the liquid effluent from said second hydrodesulfurization stage, is blended with said high boiling component.

* * * * *